(12) United States Patent
Nakamura et al.

(10) Patent No.: US 12,422,269 B2
(45) Date of Patent: Sep. 23, 2025

(54) GUIDANCE SYSTEM OF ELECTRIC MOBILITY VEHICLE

(71) Applicant: Prime Planet Energy & Solutions, Inc., Tokyo (JP)

(72) Inventors: Kohki Nakamura, Okazaki (JP); Yasuhiko Ikeda, Kobe (JP); Harumi Azuma, Okazaki (JP); Akira Kubo, Himeji (JP); Yutaka Yamauchi, Himeji (JP); Reizo Maeda, Himeji (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 185 days.

(21) Appl. No.: 18/087,815

(22) Filed: Dec. 23, 2022

(65) Prior Publication Data

US 2023/0204375 A1    Jun. 29, 2023

(30) Foreign Application Priority Data

Dec. 24, 2021    (JP) .................. 2021-210521

(51) Int. Cl.
| | |
|---|---|
| *G01C 21/00* | (2006.01) |
| *B60L 53/80* | (2019.01) |
| *B60L 58/12* | (2019.01) |
| *G01C 21/36* | (2006.01) |
| *G06Q 30/0283* | (2023.01) |
| *G06Q 30/0645* | (2023.01) |

(52) U.S. Cl.
CPC .......... *G01C 21/3679* (2013.01); *B60L 53/80* (2019.02); *B60L 58/12* (2019.02); *G01C 21/3697* (2013.01); *B60L 2250/16* (2013.01); *G06Q 30/0283* (2013.01); *G06Q 30/0645* (2013.01)

(58) Field of Classification Search
CPC . G01C 21/3679; G01C 21/3697; B60L 58/12; B60L 53/80; B60L 2250/16; G06Q 30/0283; G06Q 30/0645
See application file for complete search history.

(56) References Cited

U.S. PATENT DOCUMENTS

| | | | |
|---|---|---|---|
| 2009/0082957 A1* | 3/2009 | Agassi | B60L 53/65 701/532 |
| 2012/0306446 A1 | 12/2012 | Suganuma et al. | |
| 2014/0049216 A1 | 2/2014 | Nakagawa et al. | |
| 2017/0225742 A1* | 8/2017 | Hancock | B62M 6/45 |

(Continued)

FOREIGN PATENT DOCUMENTS

| | | |
|---|---|---|
| CN | 102700426 A | 10/2012 |
| CN | 104182492 A | 12/2014 |

(Continued)

*Primary Examiner* — Adam M Alharbi
(74) *Attorney, Agent, or Firm* — HAUPTMAN HAM, LLP

(57) ABSTRACT

An guidance system of an electric mobility vehicle includes a registration section in which replacement places of replacement batteries for the electric mobility vehicle are registered, an estimation section that estimates a possible travel distance of the electric mobility vehicle from a battery remaining capacity of the electric mobility vehicle, and a display section that displays replacement places within a range of the estimated possible travel distance of the electric mobility vehicle among the replacement places of the replacement batteries registered in the registration section on map information.

4 Claims, 3 Drawing Sheets

(56) References Cited

U.S. PATENT DOCUMENTS

| | | | |
|---|---|---|---|
| 2018/0253787 A1 | 9/2018 | Takatsuka et al. | |
| 2018/0260887 A1 | 9/2018 | Takatsuka et al. | |
| 2020/0198493 A1 | 6/2020 | Muramatsu et al. | |
| 2022/0072975 A1* | 3/2022 | O'Gorman | B60L 53/00 |
| 2023/0011596 A1 | 1/2023 | Kato et al. | |

FOREIGN PATENT DOCUMENTS

| | | |
|---|---|---|
| CN | 106546929 A | 3/2017 |
| CN | 112272909 A | 1/2021 |
| JP | 2008-131841 A | 6/2008 |
| JP | 2010191636 A | 9/2010 |
| JP | 2012-226416 A | 11/2012 |
| JP | 2014039388 A | 2/2014 |
| JP | 2014-098617 A | 5/2014 |
| JP | 2017-091427 A | 5/2017 |
| JP | 2017091426 A | 5/2017 |
| JP | 2019-164432 A | 9/2019 |
| JP | 2020102025 A | 7/2020 |
| JP | 2021-157334 A | 10/2021 |
| WO | 2010/005052 A2 | 1/2010 |

\* cited by examiner

GUIDANCE SYSTEM OF ELECTRIC MOBILITY VEHICLE

CROSS REFERENCE OF RELATED APPLICATION

The present application claims priority from Japanese Patent Application No. 2021-210521 filed on Dec. 24, 2021, which is incorporated by reference herein in its entirety.

BACKGROUND

The present disclosure relates to a guidance system of an electric mobility vehicle.

For example, Japanese Laid-open Patent Publication No. 2017-91426 discloses, for a battery pack of an electric mobility vehicle, such as an electric bicycle or the like, a charging device configured such that a battery pack with a low remaining capacity can be replaced with a charged battery pack and a reservation management system that reserves replacement of a battery pack in the charging device. The reservation management system disclosed in Japanese Laid-open Patent Publication No. 2017-91426 is configured to search for a charging device that can be reserved if the reservation management system determines a certain charging device cannot be reserved, and transmits, if there is a charging device that can be reserved, information for the charging device to an information terminal. According to Japanese Laid-open Patent Publication No. 2017-91426, the information for the charging device may include navigation to the charging device.

Japanese Laid-open Patent Publication No. 2010-191636 discloses a battery replacement system used for an electric bicycle or the like and including an IC chip that is mounted on a battery and on which history data, such as the number of times the battery can be recharged or the like, is written, and an evaluation device that determines a difference in value between a battery that has been removed and a battery with which the removed battery is to be replaced, based on the history written on the IC chip.

Each of Japanese Laid-open Patent Publication No. 2020-102025 and Japanese Laid-open Patent Publication No. 2014-39388 discloses a system that promotes charging of an on-vehicle storage battery with electricity generated using renewable energy. According to the system disclosed in Japanese Laid-open Patent Publication No. 2020-102025, in order to achieve the promotion, a coupon that can be used at stores provided around power supply facilities where the on-vehicle battery can be charged with electricity generated using renewable energy is issued. According to the system disclosed in Japanese Laid-open Patent Publication No. 2014-39388, a power storage amount of power generated using renewable energy is managed separately from a power storage amount of power supplied from a grid.

SUMMARY

In the system disclosed in Japanese Laid-open Patent Publication No. 2017-91426, there is a probability that a user cannot reach the navigated charging device within a range of a remaining capacity of a battery pack.

A guidance system of an electric mobility vehicle proposed herein includes a registration section in which replacement places of replacement batteries for the electric mobility vehicle are registered, an estimation section that estimates a possible travel distance of the electric mobility vehicle from a battery remaining capacity of the electric mobility vehicle, and a display section that displays replacement places within a range of the estimated possible travel distance of the electric mobility vehicle among the replacement places of the replacement batteries registered in the registration section on map information.

According to the guidance system of an electric mobility vehicle described above, a user of the electric mobility vehicle can know replacement places of replacement batteries estimated to be reachable within a range of the battery remaining capacity. Therefore, a probability that the electric mobility vehicle cannot reach a replacement place of a replacement battery within a range of a battery remaining capacity can be reduced.

The guidance system of an electric mobility vehicle may further include a destination input section to which a destination headed by the electric mobility vehicle is input, and a selection section that selects a replacement place of the replacement battery based on the estimated possible travel distance of the electric mobility vehicle and the destination input to the destination input section. The replacement places may include replacement places having replacement batteries each of which has been charged with power generated by renewable energy at least partially, and the registration section may register the replacement places having the replacement batteries each of which has been charged with power generated by renewable energy at least partially as priority facilities. The selection section may be configured to select the priority facility with a higher priority.

The guidance system of an electric mobility vehicle may further include a price setting section that sets rental prices of the replacement batteries. The price setting section may set a rental price for a replacement battery with a larger ratio of a battery capacity charged with power generated by renewable energy lower than that for a replacement battery with a smaller ratio of a battery capacity charged with power generated by renewable energy. The display section may display the rental prices of the replacement batteries.

DETAILED DESCRIPTION

One preferred embodiment of a guidance system of an electric mobility vehicle disclosed herein will be described below with reference to the accompanying drawings. As a matter of course, the preferred embodiment described herein is not intended to be particularly limiting the present disclosure. The present disclosure is not limited to the preferred embodiment described herein, unless specifically stated otherwise. Members/portions that have the same effect will be denoted by the same sign as appropriate and the overlapping description will be omitted as appropriate.

Figure 1:
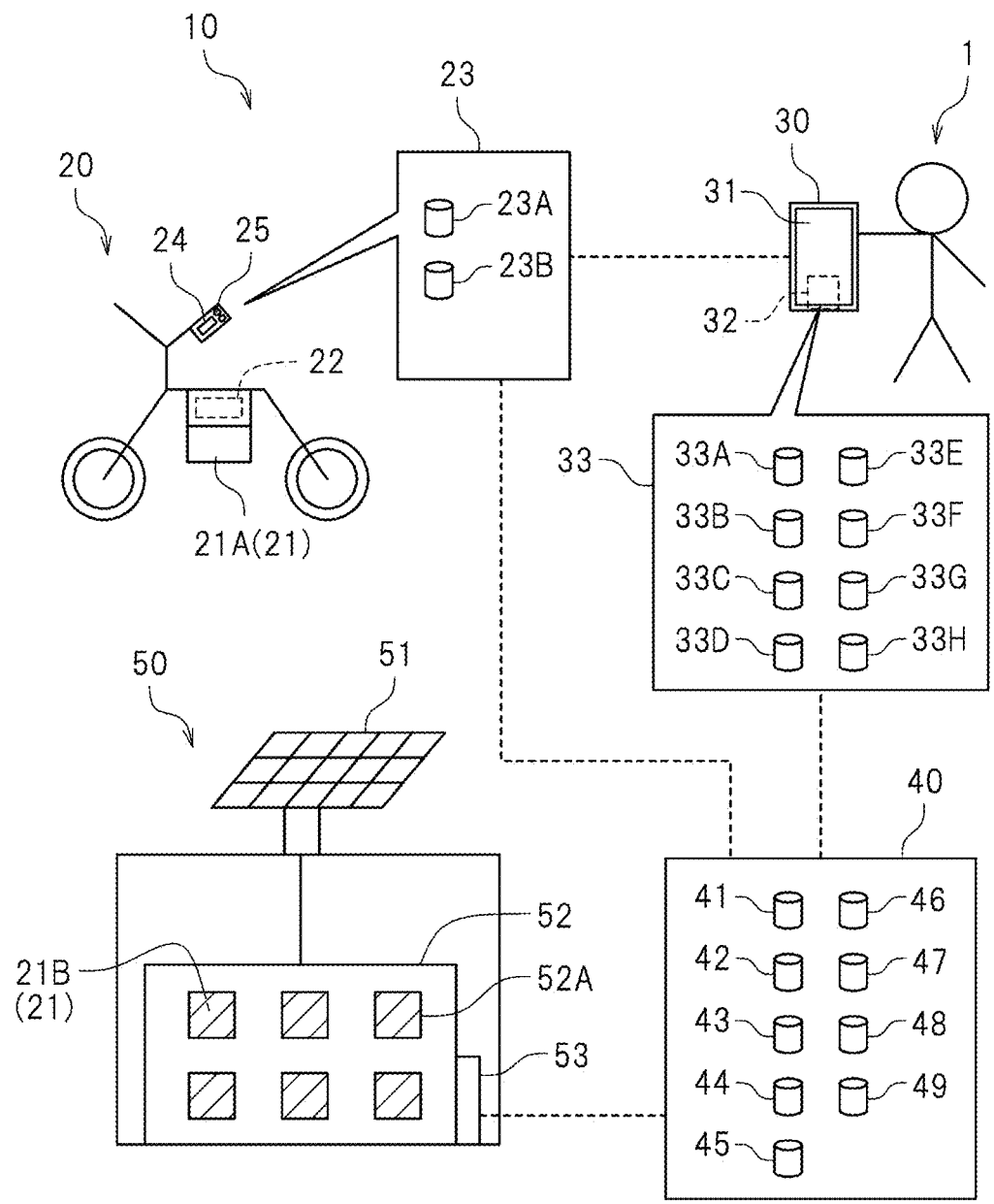
FIG. 1 is a diagram illustrating a configuration of a guidance system of an electric mobility vehicle according to a preferred embodiment.

FIG. 1 is a diagram illustrating a configuration of a guidance system 10 of an electric mobility vehicle according to a preferred embodiment (which will be hereinafter also referred to simply as a "guidance system 10"). The guidance system 10 guides an electric mobility vehicle 20 a battery of which can be replaced to a battery replacement spot 50. Herein, the guidance system 10 refers to a destination of the electric mobility vehicle 20 that has been input and a remaining capacity of a battery 21 to guide the electric mobility vehicle 20 to an appropriate battery replacement spot 50. The guidance system 10 is realized, for example, by a server of a client-server system. However, the guidance system 10 may be realized by cloud computing.

As illustrated in FIG. 1, the guidance system 10 according to this preferred embodiment includes the electric mobility vehicle 20, a user terminal 30, a server device 40, and the battery replacement spots 50. In the guidance system 10 according to this preferred embodiment, the user terminal 30 carried by a user 1 is configured to be communicable with the electric mobility vehicle 20 and the server device 40 and mediates between the server device 40 and the electric mobility vehicle 20. However, the electric mobility vehicle 20 itself may be configured to be able to execute a function of the user terminal 30. In that case, the user terminal 30 may not be used. Alternatively, the electric mobility vehicle 20 may be configured not to communicate with either of the server device 40 or the user terminal 30, In that case, the user 1 may manually input information displayed on the electric mobility vehicle 20 to the user terminal 30. As another option, functions carried by the electric mobility vehicle 20, the user terminal 30, the server device 40, and the battery replacement spot 50 may be interchanged.

The electric mobility vehicle 20 is, for example, an electrically-assisted bicycle configured such that a motor is driven by the battery 21 to assist propulsion. However, there is no particular limitation on a type of the electric mobility vehicle 20 if the electric mobility vehicle 20 is an electric mobility vehicle the battery 21 of which can be replaced. The electric mobility vehicle 20 may be, for example, an electric motorcycle. The electric mobility vehicle 20 may be a rental mobility vehicle that is rented by a user and may be a mobility vehicle that is owned by the user 1.

As illustrated in FIG. 1, the electric mobility vehicle 20 includes the battery 21, a remaining capacity acquisition device 22, an on-board computer 23, a display device 24, and a mode switching device 25. The battery 21 is, for example, a lithium-ion secondary battery. However, there is no particular limited on a type of the battery 21. The remaining capacity acquisition device 22 acquires a remaining capacity of the battery 21. Information of the remaining capacity of the battery 21 acquired by the remaining capacity acquisition device 22 is at least temporarily stored in the on-board computer 23.

The display device 24 displays information of the electric mobility vehicle 20 including the remaining capacity of the battery 21 or the like. The display device 24 includes, for example, a small liquid crystal display. In addition to the remaining capacity of the battery 21, for example, a mode of electric assist is displayed on the display device 24. Examples of the mode of electric assist include, for example, a power saving mode, a standard mode, a strong mode with a strong electric assist, or the like. The mode switching device 25 includes, for example, an operation button used for switching the mode of electric assist. However, the electric mobility vehicle 20 may be an electric mobility vehicle that does not include the display device 24 or the mode switching device 25.

The on-board computer 23 is configured to be communicable with the user terminal 30 and the server device 40. The electric mobility vehicle 20 is identified by the server device 40 by communication between the on-board computer 23 and the server device 40. Herein, the on-board computer 23 includes an authentication portion 23A that authenticates the user terminal 30 that is a transmission and reception destination of information and an information transmission section 23B that transmits information including the information of the remaining capacity of the battery 21 to the user terminal 30. In a case where the electric mobility vehicle 20 is a rental mobility vehicle, authentication of the user terminal 30 by the authentication portion 23A is temporary. In a case where the electric mobility vehicle 20 is owned by the user 1, authentication of the user terminal 30 by the authentication portion 23A may be fixed. The on-board computer 23 may be configured to transmit information directly to the server device 40, not via the user terminal 30.

The user terminal 30 is, for example, a smartphone, a tablet terminal, or the like used by the user 1. Preferably, the user terminal 30 is configured such that the user 1 can carry the user terminal 30. The user terminal 30 includes an operation screen 31 and a computer 32. The operation screen 31 is, for example, touch panel. However, the user terminal 30 may be operated via a mechanical button or the like, not via the operation screen 31 or in addition to the operation screen 31. Herein, the computer 32 constitutes a processing unit 33 that processes, for example, information that has been input to the operation screen 31, information received from the electric mobility vehicle 20, and information received from the server device 40 by an installed application software and transmits information to the server device 40.

The processing unit 33 includes a battery remaining capacity reception section 33A, a possible travel distance estimation section 33B, a positional information acquisition section 33C, a destination input section 33D, a reservation section 33E, an information transmission section 33F, an information reception section 33G, and a display section 33H. The battery remaining capacity reception section 33A receives the information of the remaining capacity of the battery 21 acquired by the remaining capacity acquisition device 22 of the electric mobility vehicle 20 from the electric mobility vehicle 20. However, the user 1 may input the information of the remaining capacity of the battery 21 to the user terminal 30 using the operation screen 31.

The possible travel distance estimation section 33B estimates a possible travel distance of the electric mobility vehicle 20 from the battery remaining capacity of the electric mobility vehicle 20. The possible travel distance estimation section 33B may be provided in the electric mobility vehicle 20. In that case, the user terminal 30 receives information of the estimated possible travel distance of the electric mobility vehicle 20 from the electric mobility vehicle 20. Alternatively, the information of the estimated possible travel distance of the electric mobility vehicle 20 is input to the user terminal 30 by the user 1. As still another option, a function of the possible travel distance estimation section 33B may be carried by the server device 40.

Herein, the estimated possible travel distance of the electric mobility vehicle 20 means an estimated distance that the electric mobility vehicle 20 can travel with electric assist received from the battery 21 due to discharge of the battery 21. The estimated possible travel distance of the electric mobility vehicle 20 may differ depending on the mode of electric assist. In a case of an electric assist bicycle, even after the electric assist bicycle cannot receive electric assist, the user 1 can pedal the bicycle and thus the bicycle can travel. In a case of the electric mobility vehicle 20 that cannot travel without the battery 21, the estimated possible travel distance of the electric mobility vehicle 20 means an estimated distance that the electric mobility vehicle 20 can receive discharge of the battery 21 and thus travel.

The positional information acquisition section 33C acquires positional information of the user terminal 30 on a map, for example, using a global positioning system (GPS). A current position of the user terminal 30 is specified by the positional information acquisition section 33C. A destination headed by the electric mobility vehicle 20 is input to the destination input section 33D. The destination may be input, for example, by selecting a point on the map, and may be input by inputting an address, a name, or the like. There is no particular limitation on a method for inputting a destination. In this preferred embodiment, whether to input the destination headed by the electric mobility vehicle 20 is up to the user 1.

In the reservation section 33E, a reservation for rental of the replacement battery 21 in the battery replacement spot 50 can be made. In the following, a battery that is attached to the electric mobility vehicle 20 and is in use will be denoted by a reference sign 21A and a replacement battery will be denoted by a reference sign 21B, if it is necessary to distinguish these batteries from each other. In this preferred embodiment, the battery 21 is a rental battery that is updated with a charged one by replacement in the battery replacement spot 50. In each reservation made via the reservation section 33E, one of a plurality of battery replacement spots 50 is selected. The battery replacement spot 50 that is to be selected will be described later.

The information transmission section 33F transmits information to the server device 40. The information transmitted to the server device 40 includes, for example, current location information of the user terminal 30, destination information of the electric mobility vehicle 20, the information of the estimated possible travel distance of the electric mobility vehicle 20, reservation information of a replacement battery 21B, or the like. The information reception section 33G receives information from the server device 40. The information received from the server device 40 includes, for example, information of a recommended route of the electric mobility vehicle 20 including a recommended battery replacement spot 50, warning information, or the like.

The display section 33H displays battery replacement spots 50 within a range of the estimated possible travel distance of the electric mobility vehicle 20 among the battery replacement spots 50 registered in a spot registration section 43 of the server device 40 (which will be described later) on map information. The display section 33H displays a location of the electric mobility vehicle 20 or a location of the user 1 on the map information. Herein, the location of the user 1 is estimated as a location of the user terminal 30. The display section 33H displays the recommended battery replacement spot 50 and the recommended route selected based on a current location of the user terminal 30 or the electric mobility vehicle 20, the destination of the electric mobility vehicle 20, and the estimated possible travel distance of the electric mobility vehicle 20, Herein, the display section 33H displays the information described above on the operation screen 31. Herein, the display section 33H displays a rental price of the replacement battery 21B as well. The display section 33H may be configured to display some other information than the information described above.

The server device 40 manages the guidance system 10. The server device 40 may be realized by a single computer and may be realized by cooperation of a plurality of computers. The server device 40 includes, for example, an I/F, a CPU, a ROM, and a RAM. As illustrated in FIG. 1, the server device 40 includes an information reception section 41, an information transmission section 42, a spot registration section 43, a spot selection section 44, a route selection section 45, a price setting section 46, a reservation reception section 47, a spot management section 48, and a warning section 49, The server device 40 may include some other processing section, but illustration and description thereof will be omitted herein.

The information reception section 41 receives information including the current location of the user terminal 30 or the electric mobility vehicle 20, the destination of the electric mobility vehicle 20, the estimated possible travel distance of the electric mobility vehicle 20, the reservation information of the replacement battery 21B, or the like from the user terminal 30 or the electric mobility vehicle 20. The information transmission section 42 transmits, for example, the information of the recommended route of the electric mobility vehicle 20 including the recommended battery replacement spot 50, the warning information, or the like to the user terminal 30.

In the spot registration section 43, the battery replacement spots 50 are registered. The number of the battery replacement spots 50 is plural. Herein, in the spot registration section 43, battery replacement spots 50 having replacement batteries 21B charged with power generated by renewable energy are registered as priority facilities. The battery replacement spots 50 include a battery replacement spots 50 having replacement batteries 21B each of which has been charged with power generated by renewable energy at least partially, and the replacement batteries 21B include the replacement batteries 21B each of which has been charged with power generated by renewable energy at least partially.

The spot selection section 44 selects a battery replacement spot 50 where the battery 21A is replaced with the replacement battery 21B, based on the possible travel distance of the electric mobility vehicle 20 estimated by the possible travel distance estimation section 33B, the destination input to the destination input section 33D, and the current location of the electric mobility vehicle 20 or the user terminal 30. In a case where the user 1 did not input the destination of the electric mobility vehicle 20, the recommended battery replacement spot 50 may not be selected. In this case, the display section 33H displays the battery replacement spots 50 within the range of the estimated possible travel distance of the electric mobility vehicle 20 among the battery replacement spots 50 registered in the spot registration section 43, and may not display the recommended battery replacement spot 50 among the battery replacement spots 50 within the range of the estimated possible travel distance of the electric mobility vehicle 20.

In this preferred embodiment, the spot selection section 44 is configured to select a priority facility having replacement batteries 21B charged with power generated by renewable energy with a higher priority. For example, the spot selection section 44 may be set to search for the battery replacement spots 50 that the electric mobility vehicle 20 stops by and thus can reach the destination and, if a priority facility is included among the battery replacement spots 50 found in the search, select a priority facility. However, an increase in distance caused by stopping by the priority facility or the like may be taken into consideration, There is no particular limitation on what kind of selection flow in which the battery replacement spot 50 is selected if the electric mobility vehicle 20 can reach the destination. "Selecting the battery replacement spot 50 with a higher priority" includes, in addition to guiding the user 1 to the selected battery replacement spot 50, for example, displaying the selected battery replacement spot 50 with a higher priority or in a manner in which it can be known that the selected battery replacement spot 50 is recommended. The route selection section 45 selects a route to the destination via the recommended battery replacement spot 50 or the reserved battery replacement spot 50.

In the price setting section 46, the rental price of the replacement battery 21B is set. In this preferred embodiment, the price setting section 46 sets the rental price for the replacement battery 21B with a larger ratio of a battery capacity charged with power generated by renewable energy lower than that for the replacement battery 21B with a smaller ratio of a battery capacity charged with power generated by renewable energy. Herein, the rental price may mean a unit price per predetermined power amount, and the power amount may mean a difference between a charge amount of the replacement battery 21B and a remaining capacity of the battery 21A that is returned. In the price setting section 46, instead of discount of the rental price, some other incentive may be given to the user 1. The rental price may be a substantial price discounted based on the incentive. Examples of the incentive include, for example, a coupon for electricity or some other commodity. The coupon may be a paper coupon and may be an electronic coupon.

The reservation reception section 47 receives a reservation for the replacement battery 21B made by the user 1 via the user terminal 30. The spot management section 48 manages power generation devices 51, charging devices 52, or the like of the battery replacement spots 50 via management devices 53 of the battery replacement spots 50.

The warning section 49 transmits a warning to the user terminal 30, for example, when consumption of the battery 21A in use is larger than expected or when it has become more likely that the electric mobility vehicle 20 cannot reach the selected battery replacement spot 50 because the user 1 selected some other route than a recommended route or for like reason. In this preferred embodiment, a route of the electric mobility vehicle 20 and a remaining capacity of the battery 21A in use are comprehended by the server device 40 in real time, There is no particular limitation on warning contents of the warning section 49. The warning section 49 may be configured to transmit information of the battery replacement spot 50 reselected by the spot selection section 44 to the user terminal 30. The warning section 49 may be configured to transmit a message that prompts change of the mode of electric assist to a mode with lower power consumption to the user terminal 30. In a case where the electric mobility vehicle 20 is an electric assist bicycle or the like that can travel without the battery 21, the warning section 49 may be configured to display a possible distance or route that requires self traveling. In that case, the warning section 49 may be configured to display a difficulty level of self-traveling, such as an elevation difference of the route or the like.

As illustrated in FIG. 1, the battery replacement spot 50 according to one preferred embodiment includes the power generation device 51, the charging device 52, and the management device 53 that manages the power generation device 51 and the charging device 52. However, a part of or all of the battery replacement spots 50 may not include the power generation device 51. Each of those battery replacement spots 50 may include at least the charging device 52 that can charge a plurality of batteries 21 and the management device 53 that manages the charging device 52. For example, in a case where grid power is used, the battery replacement spot 50 may be provided in a commercial facility or the like.

The power generation device 51 may be preferably a device, such as a solar power generation device, a wind power generation device, or the like, that generates power by renewable energy. The charging device 52 is preferably provided near the power generation device 51 in consideration of efficiency of power transportation. Herein, the charging device 52 includes a plurality of charging ports 52A configured such that each one of the batteries 21 can be charged via a corresponding one of the charging ports 52A. The charging device 52 is managed by the management device 53 and is configured such that the reserved replacement battery 21B can be taken out from the charging port 52A. The management device 53 is, for example, a computer. The used bate 21A can be attached to a vacant or designated charging port 52A. However, the charging device 52 may not be connected to the management device 53. The charging device 52 may be managed by an operation performed by an operator (for example, an employee who carries out a lending work for the battery 21) who has acquired information from the management device 53.

A flow of route guidance in a case where the user 1 inputs the destination of the electric mobility vehicle 20 will be described below with reference to a flowchart. If the destination of the electric mobility vehicle 20 has not been input, the display section 33H of the guidance system 10 may simply display battery replacement spots 50 within the range of the possible travel distance of the electric mobility vehicle 20 estimated by the possible travel distance estimation section 33B among the battery replacement spots 50 registered in the spot registration section 43 on map information. The display section 33H may further display a battery replacement spots 50 out of the range of the possible travel distance of the electric mobility vehicle 20 on the map information. In that case, the display section 33H displays the battery replacement spots 50 out of the range of the possible travel distance of the electric mobility vehicle 20 in a form where the battery replacement spots 50 out of the range can be distinguished from the battery replacement spots 50 within the range.

Figure 2:
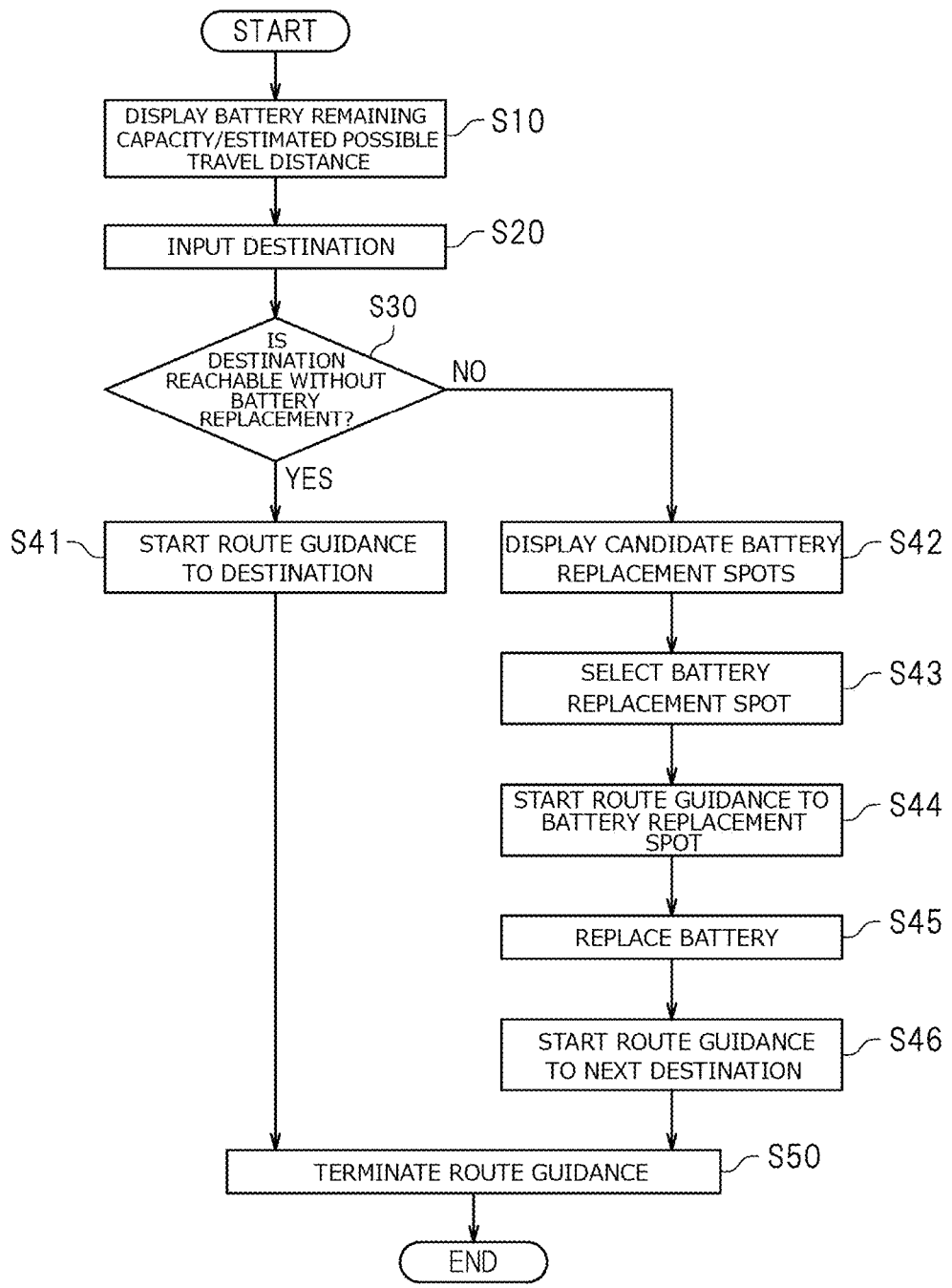
FIG. 2 is a flowchart illustrating an example of route selection performed by the guidance system.

FIG. 2 is a flowchart illustrating an example of route selection performed by the guidance system 10. As illustrated in FIG. 2, in Step S10 of route selection, for example, based on an operation of starting a guidance performed by the user 1, the remaining capacity of the battery 21A and the estimated possible travel distance of the electric mobility vehicle 20 are displayed on the user terminal 30. In Step S20, the user 1 inputs the destination of the electric mobility vehicle 20. Step S10 and Step S20 may be performed in a reversed order.

In subsequent Step S30, whether the electric mobility vehicle 20 can reach the destination that has been input without replacing the battery 21A is determined. If it is determined that the electric mobility vehicle 20 can reach the destination without replacing the battery 21A (if a result of the Step S30 is YES), the guidance system 10 guides a route to the destination in Step S41. When the electric mobility vehicle 20 reaches the destination, the guidance system 10 terminates the guidance in Step S50.

In Step S30, if it is determined that the electric mobility vehicle 20 cannot reach the destination without replacing the battery 21A (if the result of the Step S30 is NO), in Step S42, the guidance system 10 displays the battery replacement spots 50 estimated reachable with the remaining capacity of the battery 21A as candidate stopover points on the user terminal 30. At this time, the guidance system 10 may display battery replacement spots 50 registered as priority facilities (herein, the battery replacement spots 50 having the replacement batteries 21B charged with power generated by renewable energy) distinguishable from the other battery replacement spots 50. The guidance system 10 may cause the user terminal 30 to display a rental prices of the replacement batteries 21B or some other type of incentives thereon. The guidance system 10 may cause the user terminal 30 to display traffic information, such as a congestion state of a road or the like, thereon.

In Step S43, the battery replacement spot 50 as a stopover point is selected by the user 1, As another option, in a case where the user 1 lets the guidance system 10 to select a battery replacement spot 50, a battery replacement spot 50 that the electric mobility vehicle 20 stops by may be selected by the guidance system 10. In Step S43, a reservation for the replacement battery 21B may be made. The number of the battery replacement spots 50 to be selected may be one or more.

Figure 3:
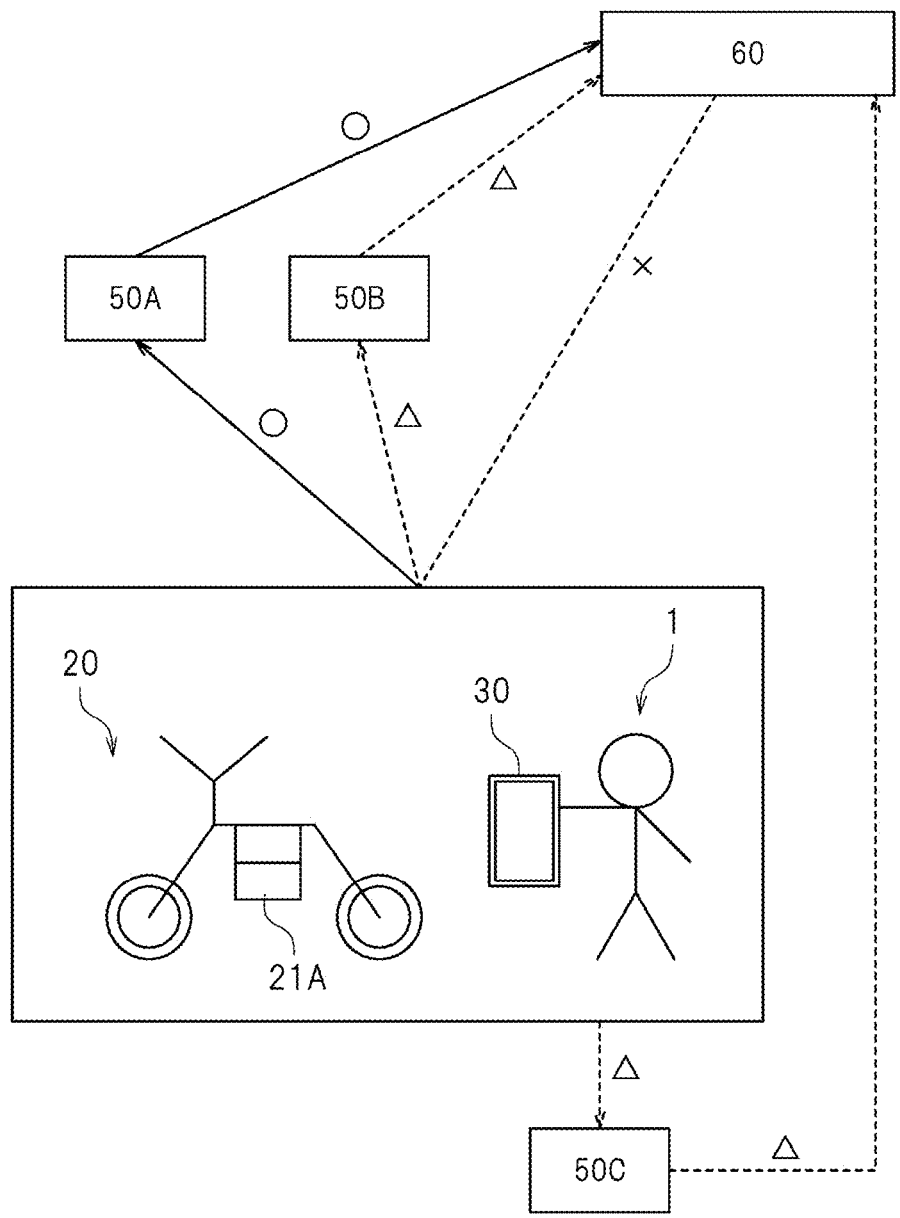
FIG. 3 is a schematic diagram of route selection performed by the guidance system.

FIG. 3 is a schematic diagram of route selection performed by the guidance system 10. As illustrated in FIG. 3, if the guidance system 10 determines that the electric mobility vehicle 20 cannot reach a destination 60 without replacing the battery 21A, the guidance system 10 recommends a first battery replacement spot 50A as a stopover point to the user 1. In this example, a second battery replacement spot 50B is not the battery replacement spot 50 having the replacement batteries 21B charged with power generated by renewable energy. Therefore, the second battery replacement spot 50B is not recommended by the guidance system 10. Moreover, in this example, a third battery replacement spot 50C is located in a different direction from a direction of the destination 60. Therefore, the third battery replacement spot 50C is not recommended by the guidance system 10.

In Step S44, route guidance to the battery replacement spot 50A as a stopover point is started. When the electric mobility vehicle 20 reaches the selected battery replacement spot 50A, the battery 21 is replaced in Step S45. At this time, which replacement battery 21B is to be received (if a reservation has been made, which replacement battery 21B has been reserved) may be displayed on the user terminal 30.

After the battery 21 has been replaced, route guidance to a next destination (a final destination or a next stopover point) is started in Step S46. Also in this case, when the electric mobility vehicle 20 reaches the final destination, the guidance system 10 terminates the guidance in Step S50. In a case where there is a battery replacement spot 50 or a return spot of the replacement battery 21B near the final destination, the guidance system 10 may inform the user 1 of those spots.

A start point of the electric mobility vehicle 20 is not limited and may be, for example, a rental spot of the electric mobility vehicle 20. The rental spot of the electric mobility vehicle 20 may be, for example, in or around a transport facility, such as a train station, a bus stop, or the like, a public facility, such as a tourist information office or the like, or a lodging facility. In a case where an owner of the electric mobility vehicle 20 is the user 1 or like case, the start point of the electric mobility vehicle 20 may be a home of the user 1. The destination of the electric mobility vehicle 20 is also not limited. The guidance system 10 may be configured to recommend the destination itself conditionally or unconditionally. In that case, the recommended destination is preferably a spot near a power generation facility that generates power by renewable energy and tends to generate surplus power from a viewpoint of utilization of renewable energy. Examples of such spots include a park where a solar power generation device is installed, a seaside where a wind power generation device is installed, or the like.

As described above, the guidance system 10 of the electric mobility vehicle 20 according to this preferred embodiment relates to the electric mobility vehicle 20 a battery of which can be replaced and includes the spot registration section 43 in which replacement places (the battery replacement spot 50) of the replacement batteries 21B are registered, the possible travel distance estimation section 33B that estimates the possible travel distance of the electric mobility vehicle 20 from the remaining capacity of the battery 21A of the electric mobility vehicle 20, and the display section 33H that displays the battery replacement spot 50 in the range of the estimated possible travel distance of the electric mobility vehicle 20 among the battery replacement spots 50 registered in the spot registration section 43 on the map information. According to the guidance system 10, the user 1 of the electric mobility vehicle 20 can know the battery replacement spot 50 estimated reachable within the range of the remaining capacity of the battery 21A. Therefore, a probability that the electric mobility vehicle 20 cannot reach the battery replacement spot 50 within the range of the remaining capacity of the battery 21A can be reduced.

The guidance system 10 according to this preferred embodiment includes the destination input section 33D in which the destination headed by the electric mobility vehicle 20 is input and the spot selection section 44 that selects a battery replacement spot 50, based on the estimated possible travel distance of the electric mobility vehicle 20 and the destination input to the destination input section 33D. According to the guidance system 10, a suitable battery replacement spot 50 is selected in accordance with the destination of the electric mobility vehicle 20. Therefore, moving efficiency is excellent and a trouble, such as running out of the remaining capacity of the battery 21A or the like, is less likely to occur.

In this preferred embodiment, the battery replacement spots 50 include the battery replacement spots 50 having the replacement batteries 21B each of which is charged with power generated by renewable energy at least partially. In the spot registration section 43, the battery replacement spots 50 having the replacement batteries 21B each of which is charged with power generated by renewable energy at least partially are registered as priority facilities. The spot selection section 44 is configured to select the priority facility with a higher priority. According to the guidance system 10, use of power generated by renewable energy can be promoted. As a result, the technology disclosed herein can contribute preservation of the global environment.

The guidance system 10 according to this preferred embodiment includes the price setting section 46 that sets the rental prices of the replacement batteries 21B. The price setting section 46 sets the rental price for the replacement battery 21B with a larger ratio of a battery capacity charged with power generated by renewable energy lower than that for the replacement battery 21B with a smaller ratio of a battery capacity charged with power generated by renewable energy. The display section 33H displays the rental prices of the replacement batteries 21B. According to the guidance system 10, use of power generated by renewable energy can be promoted.

What is claimed is:
1. A guidance system of an electric mobility vehicle comprising:
 a registration section in which replacement places of replacement batteries for the electric mobility vehicle are registered, an estimation section that estimates a possible travel distance of the electric mobility vehicle from a battery remaining capacity of the electric mobility vehicle, a display section that displays replacement places within a range of the estimated possible travel distance of the electric mobility vehicle among the replacement places of the replacement batteries registered in the registration section on map information, a destination input section to which a destination headed by the electric mobility vehicle is input, and a selection section that selects a replacement place of the replacement battery based on the estimated possible travel distance of the electric mobility vehicle and the destination input to the destination input section, wherein the selection section is configured to select a replacement place, among the replacement places registered in the registration section, in order of priority: (1) to be reachable under the battery remaining capacity, (2) charging rate of renewable energy, and (3) to be in a direction closer to a direction of the destination from the current location of the electric mobility vehicle.

2. The guidance system of an electric mobility vehicle according to claim 1, further comprising a price setting section that sets rental prices of the replacement batteries, wherein the replacement batteries include replacement batteries each of which has been charged with power generated by renewable energy at least partially, the price setting section sets a rental price for a replacement battery with a larger ratio of a battery capacity charged with power generated by renewable energy lower than that for a replacement battery with a smaller ratio of a battery capacity charged with power generated by renewable energy, and the display section displays the rental prices of the replacement batteries.

3. A guidance system of an electric mobility vehicle comprising:

a registration section in which replacement places of replacement batteries for the electric mobility vehicle are registered, an estimation section that estimates a possible travel distance of the electric mobility vehicle from a battery remaining capacity of the electric mobility vehicle, a display section that displays replacement places within a range of the estimated possible travel distance of the electric mobility vehicle among the replacement places of the replacement batteries registered in the registration section on map information, and a warning section that transmits a warning to a user terminal when it has become likely that the electric mobility vehicle cannot reach the selected replacement place, wherein the electric mobility vehicle can travel without the battery, and the warning section is configured to display a route and a distance that requires self-traveling.

4. A guidance system of an electric mobility vehicle comprising:

a registration section in which replacement places of replacement batteries for the electric mobility vehicle are registered, an estimation section that estimates a possible travel distance of the electric mobility vehicle from a battery remaining capacity of the electric mobility vehicle, a display section that displays replacement places within a range of the estimated possible travel distance of the electric mobility vehicle among the replacement places of the replacement batteries registered in the registration section on map information of a user terminal, a price setting section that sets rental prices of the replacement batteries, and a reservation section configured to be able to make a reservation for rental of the replacement battery by the user terminal, wherein the replacement batteries include replacement batteries each of which has been charged with power generated by renewable energy at least partially, the price setting section sets a rental price for a replacement battery with a larger ratio of a battery capacity charged with power generated by renewable energy lower than that for a replacement battery with a smaller ratio of a battery capacity charged with power generated by renewable energy, and the display section displays the rental prices of the replacement batteries.

* * * * *